United States Patent [19]
Kärki et al.

[11] Patent Number: 5,790,944
[45] Date of Patent: Aug. 4, 1998

[54] MEASUREMENT OF GAIN ERROR IN A BASE STATION RECEIVER, AND IMPROVEMENT IN FIELD STRENGTH MEASUREMENT

[75] Inventors: Tapani Kärki; Eero Välitalo; Jorma Pulkkinen, all of Oulu, Finland

[73] Assignee: Nokia Telecommunications Oy, Espoo, Finland

[21] Appl. No.: 619,716
[22] PCT Filed: Sep. 27, 1994
[86] PCT No.: PCT/FI94/00435
§ 371 Date: Jun. 26, 1996
§ 102(e) Date: Jun. 26, 1996
[87] PCT Pub. No.: WO95/09488
PCT Pub. Date: Apr. 16, 1995

[30] Foreign Application Priority Data

Sep. 28, 1993 [FI] Finland ................ 934258

[51] Int. Cl.$^6$ ................ H04B 17/02
[52] U.S. Cl. ................ 455/226.2; 455/67.1; 455/424
[58] Field of Search ................ 455/226.1, 226.2, 455/226.4, 67.1, 67.4, 234.2, 115, 126, 85, 86, 424

[56] References Cited

U.S. PATENT DOCUMENTS

| | | | |
|---|---|---|---|
| 4,619,002 | 10/1986 | Thro | 455/226.4 |
| 4,837,801 | 6/1989 | Shimura | 379/61 |
| 5,001,776 | 3/1991 | Clark | 455/226.2 |
| 5,086,508 | 2/1992 | Furuno | 455/69 |
| 5,129,098 | 7/1992 | McGirr et al. | 455/69 |
| 5,457,812 | 10/1995 | Siira et al. | 455/67.4 |
| 5,604,728 | 2/1997 | Jylha | 370/241 |

FOREIGN PATENT DOCUMENTS

| | | | |
|---|---|---|---|
| 0 462 782 | 12/1991 | European Pat. Off. | H04B 1/16 |
| 0 500 362 | 8/1992 | European Pat. Off. | H04B 1/16 |
| WO 92/17944 | 10/1992 | WIPO | H04B 1/06 |

OTHER PUBLICATIONS

Patent Abstracts of Japan, vol. 17, No. 15, E-1305, abstract of JP, A, 4-245820 (Toshiba Corp.), 2 Sep. 1992.
Patent Abstracts of Japan, vol. 18, No. 195, E-1533, abstract of JP, A, 5-347567 (Fujitsu Ltd.), 27 Dec. 1993.

*Primary Examiner*—Reinhard J. Eisenzopf
*Assistant Examiner*—Lee Nguyen
*Attorney, Agent, or Firm*—IP Group of Pillsbury Madison & Sutro LLP

[57] ABSTRACT

For measuring gain error in a receiver of a base station of a cellular system and for improving field strength measurement, a signal received by the base station is measured before and after a receiver unit. The power level is corrected after the receiver unit to correspond to the power level of the signal determined before the receiver unit. For this purpose, before the receiver unit an accurate detector of the power level of the signal is provided, the power level of the signal detected by the detector being compared to the power level measured after the receiver.

12 Claims, 2 Drawing Sheets

MEASUREMENT OF GAIN ERROR IN A BASE STATION RECEIVER, AND IMPROVEMENT IN FIELD STRENGTH MEASUREMENT

BACKGROUND OF THE INVENTION

The present invention relates to a method for measuring gain error in a receiver of a base station of a cellular system and for improving field strength measurement, this method comprising the steps of converting the frequency of a signal generated in a transmitter unit to be adapted to a receiver unit and passing the signal to the receiver unit, and generating a control signal from the signal for indicating field strength.

The invention further relates to equipment for measuring gain error in a receiver of a base station of a cellular system and for improving field strength measurement, this equipment comprising a transmitter unit, which comprises a transmitter and a power regulator of the transmitter; a receiver, which comprises a receiver unit, a distribution amplifier and a band-pass filter; a numerical signal processing unit; and a control unit, which controls the transmitter unit and the receiver.

Gain variation refers in this context to the deviation of the actual gain of the receiver unit from the nominal value of the gain. This gain variation can be as wide as about ±10 dB at a base station, due to the wide frequency range, temperature variations and inaccuracies in component values. As regards the operation of a cellular system, variations this wide are nevertheless harmful because, for example, GSM requires that the base station should continuously measure the strength of received signals during normal traffic. This is done by means of so-called RSSI calculations (Received Signal Strength Indication), whereby the signal level of a received signal is calculated on the basis of a signal obtained from the output of the base-station receiver. It is apparent that the calculated RSSI value deviates significantly from the actual one if the gain variation of the receiver is as wide as ±10 dB, and the nominal value of the gain is used in the calculations.

SUMMARY OF THE INVENTION

The object of the present invention is to provide a method and equipment for measuring the gain error in a base-station receiver and for making the RSSI value more accurate.

This method is characterized in that the power level of the signal obtained from the transmitter unit is determined before the receiver; that the power level of the signal is determined after the receiver; that the power levels of the signal determined before and after the receiver are compared to one another; and that the control signal value indicating field strength is corrected to correspond to the power level of the signal as determined before the receiver.

The equipment of the invention is further characterized in that the receiver comprises a detector element for detecting the power level of the signal coming from the transmitter unit; that after the receiver there is a detector element for determining the power level of the signal; that the control unit comprises a comparator element for comparing the power levels of the signal before and after the receiver; and that the control unit comprises a correction element for correcting the control signal indicating field strength so that it will correspond to the power level of the signal as determined before the receiver.

An essential idea of the invention is that the transmitter signal is applied directly to an available channel in the receiver and that the strength of the received test signal is measured after the receiver. Next, the power level of the test signal transmitted from the transmitter and the power level of the output signal of the receiver are compared to one another, this comparison yielding the gain between the input and output of the receiver, and thus it is possible to determine the gain error in the receiver from this gain. Another essential idea is to arrange an accurate threshold detector of the power level of the signal as close as possible to the input of the receiver, whereby it is possible to adjust the level of the transmitter test signal very accurately as desired by means of the level information produced by the threshold detector. Similarly, it is possible to compare the power level information produced by the threshold detector of the receiver to the power level of the receiver output signal and to form a difference variable from the difference of these signals, and to compensate for the signal indicating field strength by this difference. Yet another essential idea is to connect the test signal of the transmitter unit to the receiver at the earliest possible stage, whereby a highly accurate picture of the total gain error in the receiver is formed.

An essential advantage of the invention is that the gain, and at the same time the gain error, in the receiver can be monitored in use, with no need for separate measuring instruments in this arrangement. A further essential advantage is that in repairing the base station after a failure, it is possible to determine the gain automatically and to take into account a possible deviation of the gain from the nominal value when calculating the field strength.

The invention is further described in the following with reference to the attached drawings, in which.

DETAILED DESCRIPTION

Figure 1:
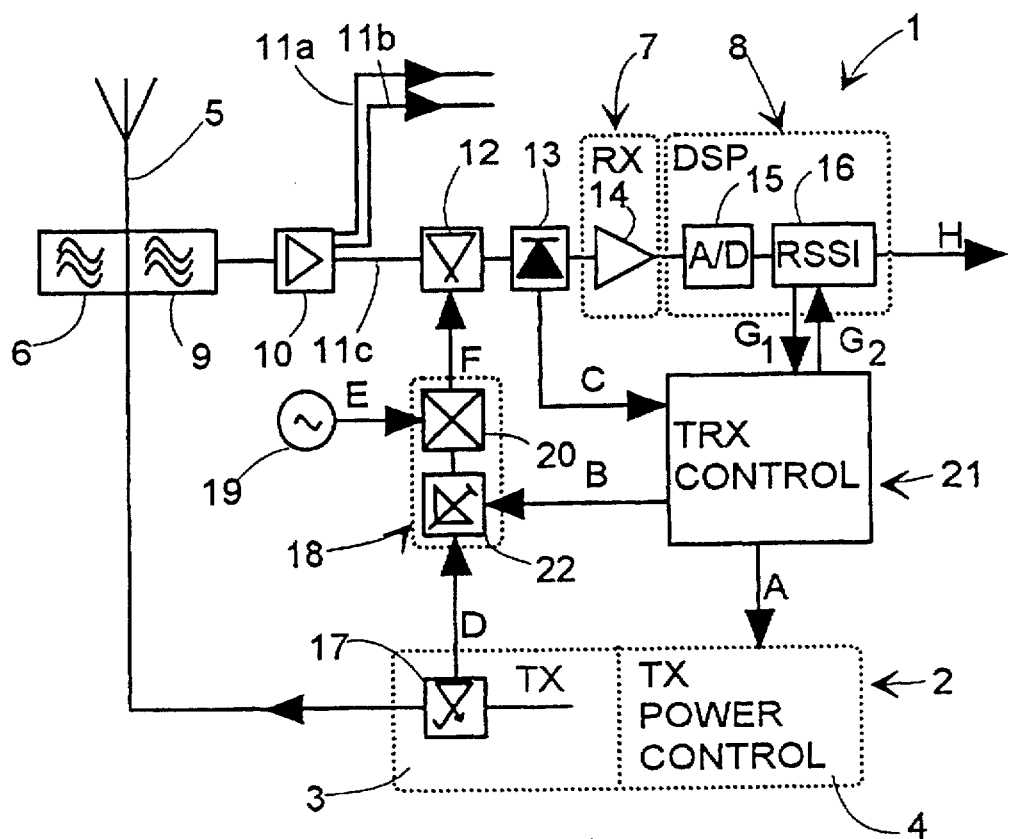
FIG. 1 shows a control principle of the transceiver system of the invention.

FIG. 1 is a schematic representation of a sub-unit 1 of a base-station transceiver system in a cellular system, this sub-unit comprising a transmitter unit 2, which is composed of a transmitter TX and a power regulator TX Power Control of the transmitter TX. In the drawings, the transmitter TX is indicated by reference numeral 3 and the power regulator TX Power Control of the transmitter TX by reference numeral 4. The transmitter unit 2 is connected to an antenna 5 via a band-pass filter 6. The receiver unit is indicated by reference numeral 7. In addition to the receiver unit 7, the receiver comprises a band-pass filter 9 and a distribution amplifier 10. Immediately after the receiver unit 7 is connected a digital signal processor DSP, which is used for numerical signal processing and which is indicated by reference numeral 8. The receiver unit 7 is connected to the antenna 5 via the band-pass filter 9 and the distribution amplifier 10. The function of the distribution amplifier 10 is to divide a signal coming from the direction of the antenna 5 into two or more branches, to each of which is connected the receiver unit 7 according to FIG. 1. The branching in FIG. 1 is indicated by lines 11a, 11b and 11c marked with arrows, the line 11c being connected to a directional coupler 12. To the directional coupler 12 is connected an accurate threshold detector 13, by which the power level of an incoming signal can be determined accurately and with reference to predetermined thresholds. To the threshold detector 13 is connected a receiver amplifier 14, the function of which in FIG. 1 is to detect different gains in the receiver unit 7 that are due for instance to variation in component values, and also to detect the operation of the actual amplifier. The received signal is then passed to the digital signal processing unit 8, which converts the analog data to digital data in a block A/D, which is indicated by reference numeral 15 and which is later referred to as A/D conversion block. Numerical processing of the signal converted to a digital form is carried out in an RSSI calculation unit 16, the power level of the incoming signal being recalculated also in a digital form. Similarly, the transmitter 3 comprises a directional coupler 17, by which a sample signal D of a lower power is taken from the signal going to the antenna 5, to be used as a test signal by a mixing unit 18. The ratio between the power of the transmitter signal going to the antenna 5 and that of the sample signal D remains constant. To the mixing unit 18 is connected a local oscillator 19, the test signal D coming from the transmitter 3 being mixed in a frequency mixer 20 by a signal E produced by the local oscillator 19. Thus, the frequency of the test signal D of the transmitter 3 is suitable to be passed via the directional coupler 12 to the threshold detector 13 and then to the receiver unit 7. The operation of the transmitter unit 2, the receiver unit 7 and the mixing unit 18 is controlled by a transceiver controller TRX Control, indicated by reference numeral 21 in FIG. 1. The transceiver controller 21 adjusts the power level of an outgoing signal by means of the power regulator 4 of the transmitter unit. Since using the power regulator 4 of the transmitter 3 for adjusting the power level of the test signal nevertheless results in a relatively coarse accuracy, about 3 dB, a precision regulation block 22 is connected to the mixing unit 18 for accurate power level regulation of the test signal, it being thus possible to adjust the power level of the test signal by said precision regulation block typically with an accuracy of about ½ dB. Respectively, the precision regulation block 22 is monitored and controlled by the transceiver controller 21. The power level of the test signal is measured by the accurate threshold detector 13 and, by means of this data, the transceiver controller 21 regulates either the power regulator 4 of the transmitter unit 2 or the precision regulation block 22 in order to obtain a desired power level for the test signal. Rough power level adjustment is indicated by arrow A, fine power level adjustment by arrow B, and level data passed by the threshold detector 13 to the transceiver controller 21 by arrow C. Similarly, a test signal going out from the transmitter is indicated by arrow D, a signal generated by the local oscillator 19 by arrow E, and a signal produced by the interaction of the signals D and E by arrow F. The digital data on the signal power level produced in the RSSI calculation unit 16 is compared in the transceiver controller 21 to the power level data C produced by the threshold detector 13. The transceiver controller 21 can correct the RSSI value on the basis of the obtained difference. The traffic between the RSSI calculation unit 16 and the transceiver controller 21 is thus bidirectional and is indicated in the figure by arrows $G_1$ and $G_2$, the arrow $G_1$ denoting an uncorrected RSSI value and the arrow $G_2$ gain error data that is passed to the RSSI calculation unit 16. From the RSSI calculation unit 16 is obtained a signal which is proportional to field strength and which does not include the gain errors of the amplifier 14 of the receiver unit 7. The obtained data is indicated by arrow H, which denotes a corrected RSSI value.

Figure 2:
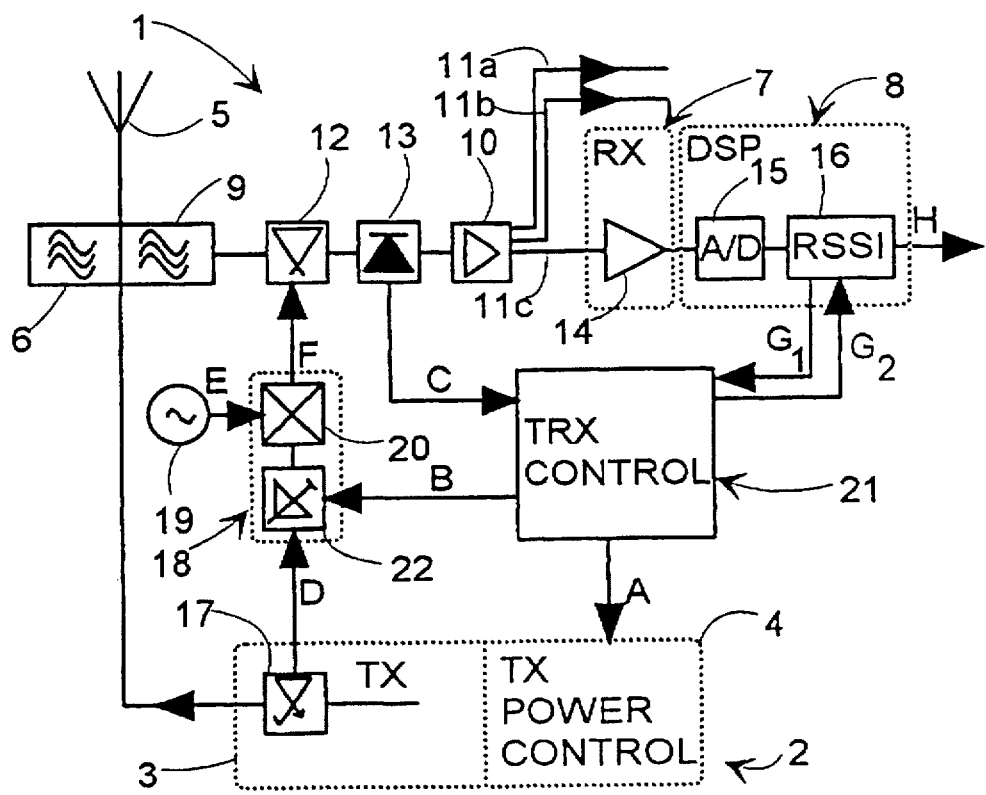
FIG. 2 shows another control principle of the transceiver system of the invention.

FIG. 2 shows another sub-unit of the transceiver system of the invention. The numbering in FIG. 2 corresponds to that in FIG. 1. FIG. 2 shows a sub-unit 1 of the transceiver system, a transmitter unit 2, a transmitter 3, a power regulator 4 of the transmitter 3, an antenna 5, a band-pass filter 6, a receiver unit 7, a digital measuring unit 8, a band-pass filter 9, a distribution amplifier 10, lines 11a–11c, a directional coupler 12, an accurate threshold detector 13, an amplifier 14 of the receiver unit 7, an A/D conversion block 15, a directional coupler 17 of the transmitter 3, a mixing unit 18, a local oscillator 19, a frequency mixer 20, a transceiver controller 21 and a precision regulation block 22. Similarly, the functions and information indicated by signals A, B, C, D, E, F, $G_1$, $G_2$ and H correspond to the description of FIG. 1. In the case of FIG. 2, the accurate threshold detector 13 is, however, provided before the distribution amplifier 10, whereby the signal power level data C produced by the threshold detector 13 is compared to the digital power level data $G_1$ produced by the RSSI calculation unit 16. This allows the gain error produced by the distribution amplifier 10 to be taken into account and to be compensated for, whereby the signal H indicating field strength will provide very accurate data corresponding to the actual field strength. Further, it is possible to carry out said level regulation so that the threshold detector 13 is replaced by a detector operating in a narrow level range, whereby it is possible to determine the gain error by adjusting the power level of the test signal D transmitted by the transmitter 3 in a situation where the level of the test signal D of the transmitter 3 is in the same range with the narrow-band level detector, and simultaneously, to determine the digital RSSI value from the RSSI calculation unit 16. The level data $G_1$ obtained from the RSSI calculation unit 16 is then compared to the threshold values of the narrow-band level detector, and the RSSI value is corrected by using the data so as to be appropriate.

Figure 3:
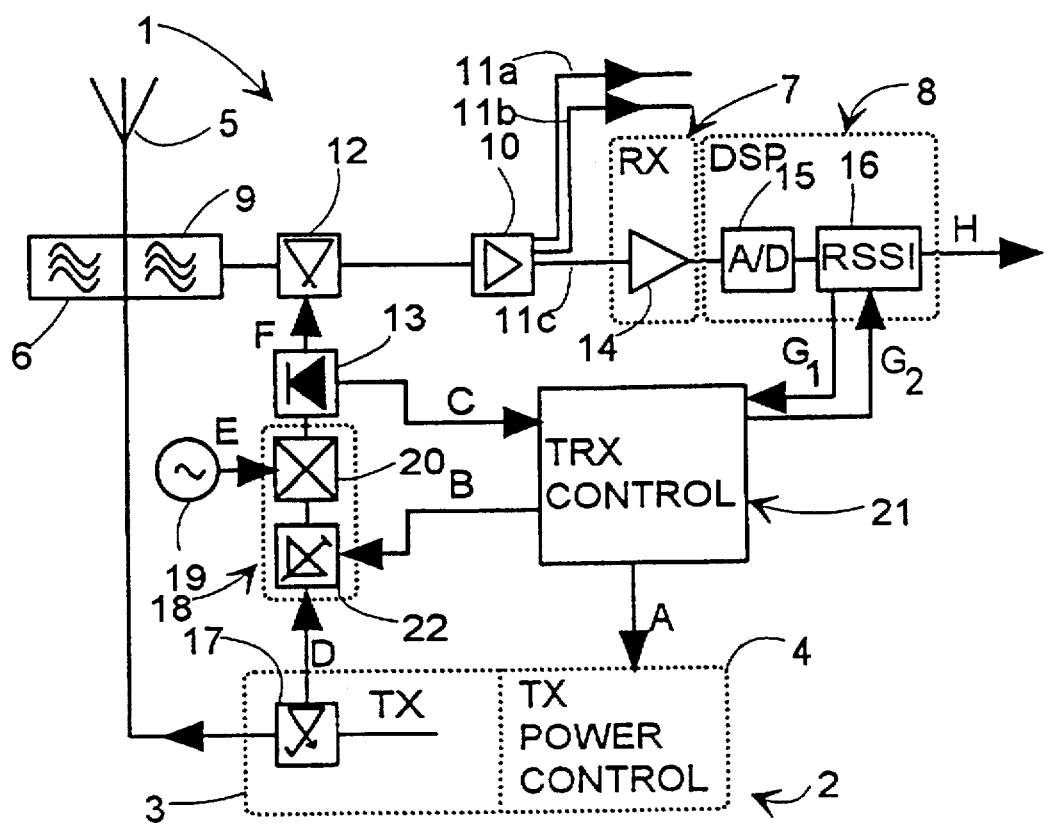
FIG. 3 shows a third control principle of the transceiver system of the invention.

FIG. 3 shows a third regulating unit that measures and corrects the gain error in a receiver of a cellular system. Numbering and symbols in FIG. 3 fully correspond to those in FIGS. 1 and 2. In FIG. 3, the threshold detector 13 is placed after the mixing unit 18, whereby the power level of the test signal D transmitted from the transmitter 3 can be measured very accurately after the frequency conversion of the test signal D. The level data C produced by the threshold detector 13 is compared to the power level data which is produced in the RSSI calculation unit 16 and which can be corrected to correspond to the power level data on the test signal F. It it thus possible by said arrangement to compensate accurately also for errors caused by the directional coupler 12 in the gain of the system.

The drawings and the description relating to them are intended only to illustrate the idea of the invention, and the invention according to the application can vary within the scope of the claims.

We claim:

1. A method for measuring gain error in a receiver of a receiver unit of a base station of a cellular system and for improving field strength measurement, comprising the steps of:

generating a signal by a transmitter of a transmitter unit of the base station, and obtaining a sample signal proportional in power thereto;

adapting said sample signal to said receiver unit and passing the adapted sample signal to said receiver unit, said adapting including converting the frequency of said sample signal to cause said adapted sample to be appropriate for reception by said receiver unit;

determining the power level of said adapted sample signal before and after said receiver to provide before and after power levels;

comparing said before and after power levels with one another;

generating a control signal indicative of field strength from said adapted sample signal as received by said receiver;

correcting the value of said control signal based on said before power level;

said base station including a distribution amplifier interposed between an antenna and said receiver, and said passing comprising applying said adapted sample signal before said distribution amplifier, and said determining being accomplished from before said distribution amplifier and after said receiver unit.

2. The method of claim 1, wherein:

said adapting includes mixing said sample signal with another signal, in a mixing unit.

3. The method claim 1, wherein:

said adapting includes converting the frequency of said sample signal to cause said adapted sample signal to be appropriate for reception by said receiver unit;

said passing comprises applying said adapted sample signal to said receiver immediately before said receiver unit; and said determining is accomplished from immediately before and immediately after said receiver unit.

4. The method of claim 1, further comprising:

said adapting includes comparing the sample signal with predetermined threshold values of power level, and adjusting the power level of said adapted sample signal so as to be between said predetermined threshold values.

5. The method of claim 1, further comprising:

measuring the power level of said sample signal.

6. The method of claim 5 further comprising:

converting said adapted sample signal from analog to digital form after said receiver; and performing said measuring on said digital from of said adapted sample signal.

7. Equipment for measuring gain error in a receiver of a base station of a cellular system and for improving field strength measurement, comprising:

a transmitter unit comprising a transmitter arranged for generating a signal regulator for said transmitter;

a receiver unit comprising a receiver, a distribution amplifier serving said receiver, and a band-pass filter serving said distribution amplifier;

a signal processing unit located between said transmitter unit and said receiver unit, and providing as output a signal proportional to field strength of said signal generated by said transmitter; a control unit arranged for controlling said transmitter unit and said receiver, a subsystem arranged for supplying a sample signal proportion in strength to said signal generated by said transmitter, to said receiver;

a first detector arranged before said distribution amplifier, for detecting the power level of said signal generated by said transmitter, before said receiver;

a second detector, located after said receiver, and arranged for determining the power level of said signal generated by said transmitter, after said receiver;

said control unit comprising a comparator element for comparing with one another said power levels as detected by said first and second detectors;

said control unit comprising a correction element arranged for correcting said signal proportional to field strength, based on the power level detected by said first detector.

8. The equipment of claim 7, further including:

said subsystem includes a mixing unit interposed between said transmitter unit and said receiver and arranged for causing said sample signal to have a frequency appropriate for reception by said receiver.

9. The equipment of claim 7, wherein:

said first detector is arranged immediately before said receiver unit.

10. The equipment of claim 7, wherein:

said first detector is arranged for detecting whether the power level of said signal generated by said transmitter is between predetermined threshold values;

said transmitter unit includes a power regulator roughly adjusting the power level of said signal generated by said transmitter; and said subsystem includes a mixing unit interposed between said transmitter unit and said receiver and arranged for causing said sample signal to have a power level which is proportional to one between said predetermined thresholds values.

11. The equipment of claim 7, wherein:

said first detector is a measuring device arranged for accurately measuring the power level of said sample signal.

12. The equipment of claim 7, wherein:

said signal processing unit includes an analog to digital converter arranged to convert the sample signal, after said receiver into digital form; and said second detector is arranged for determining the power level of said signal generated by said transmitter, by detecting the power level of said sample signal after conversion of said sample signal by said analog to digital converter to digital form.

* * * * *